United States Patent [19]

Sterzel

[11] Patent Number: 5,422,053
[45] Date of Patent: Jun. 6, 1995

[54] PRODUCTION OF FOAMED POLYLACTIDE INJECTION MOLDINGS OF HIGH STRENGTH AND RIGIDITY

[75] Inventor: Hans-Josef Sterzel, Dannstadt-Schauernheim, Germany

[73] Assignee: BASF Aktiengesellschaft, Ludwigshafen, Germany

[21] Appl. No.: 135,334

[22] Filed: Oct. 13, 1993

[30] Foreign Application Priority Data

Oct. 14, 1992 [DE] Germany .................. 42 34 620.7

[51] Int. Cl.[6] .............................................. B29C 44/02
[52] U.S. Cl. ..................................... 264/53; 264/328.1
[58] Field of Search ............... 264/51, 53, 328.1, 41; 521/84.1

[56] References Cited

U.S. PATENT DOCUMENTS

| 4,645,664 | 2/1987 | Lange | 424/78 |
|---|---|---|---|
| 4,719,246 | 1/1988 | Murdoch et al. | 521/134 |
| 4,766,182 | 8/1988 | Murdoch et al. | 525/413 |
| 4,902,515 | 2/1990 | Loomis et al. | 424/486 |
| 5,102,983 | 4/1992 | Kennedy | 528/354 |
| 5,210,108 | 5/1993 | Spinu et al. | 521/182 |
| 5,290,494 | 3/1994 | Coombes et al. | 264/41 |

*Primary Examiner*—Allan R. Kuhns
*Attorney, Agent, or Firm*—Keil & Weinkauf

[57] ABSTRACT

In a process for injection molding foamed parts of polylactide, the polylactide melt contains solvent and cools to below the melting point during the expansion in the mold and is expanded in the temperature range between the glass softening point and the melting point.

4 Claims, No Drawings

PRODUCTION OF FOAMED POLYLACTIDE INJECTION MOLDINGS OF HIGH STRENGTH AND RIGIDITY

Poly-L-lactide, poly-D-lactide and copolymers thereof are biodegradable polymers. Rotting of these polymers does not form any degradation products which are foreign to nature, but instead only biomass and carbon dioxide. Due to this behavior, polylactides have great potential for increased use, particularly in the packaging sector.

There is no need for return for recycling purposes with inconvenient collection, cleaning, sorting and melting—all energy-consuming procedures which produce environmental pollution and an increase in traffic.

From the raw materials point of view, polylactides are produced entirely from renewable sources.

Fermentation gives a 10 to 15% strength lactic acid, which is concentrated to give pure lactic acid, from which, with elimination of water and dimerization, lactide is prepared as a polymerizable monomer. In the presence of Lewis acids, L-lactide, D-lactide, DL-lactide and mixtures thereof are ring-opened to give high-molecular-weight products and polymerized with retention of the asymmetric carbon atom. The homopolymeric D- and L-lactides have melting points of around 180° C. the modulus of elasticity intention at room temperature is 3500–4000 N/mm$^2$, the tensile strength is 60–70 N/mm$^2$, and the weight average molecular weight is from 50,000 to 200,000 g/mol. The glass softening point is 50° C.

Although polylactides have all these properties which are very advantageous for polymeric materials, they have a particular disadvantage for processing: they crystallize so slowly that, in particular during injection molding, very long cooling times of up to several minutes are necessary to obtain partially crystalline moldings having heat deflection temperatures above the glass transition temperature.

It is an object of the present invention to find processing conditions for polylactides which do not have the disadvantage of slow crystallization and give moldings of high strength, rigidity and heat deflection temperature which can be processed rapidly.

We have found that this object is achieved by the features discussed here since the disadvantage of slow crystallization is utilized and turned into an outright advantage by injecting the melt into a mold and subjecting it therein to multiaxial expansion under the effect of a blowing agent at a temperature between the glass softening point and the melting point, the polylactide being oriented and predominantly crystallizing.

This procedure differs essentially from the process of the prior art for the production of injection moldings foamed using blowing agents; in the latter, blowing agents, preferably azodicarboxamides, are admixed usually as a powder, with the thermoplastic to be processed. The thermoplastic granules treated in this way are melted in the barrel of an injection-molding machine, during which the blowing agent decomposes, releasing nitrogen. Application of a high back pressure of up to 1500 bar at the nozzle keeps the nitrogen in the melt and prevents decompression. Finally, an amount of the melt/nitrogen mixture corresponding to a fraction of the mold volume is injected into the relatively cold mold, which is under atmospheric pressure, where the nitrogen expands the melt, giving a foamed molding, usually with a compact outer skin.

In order to produce a homogeneous foam structure, the thermoplastic is treated with up to 0.5% of a heterogeneous nucleating agent such as talc which nucleates the foaming process.

In contrast to the process according to the invention, the expansion is always carried out at a temperature above the melting point, since the expanding melt cools so slowly, due to its relatively low thermal conductivity, that the foaming operation has already ceased, while the temperature in the interior of the molding is still above the melting point of the thermoplastic.

The process according to the invention is described in greater detail below:

In one variant of the preparation of the injection-molding composition according to the invention, a polylactide melt is mixed with an organic solvent under the vapor pressure of the latter at from 185° to 215° C. in a gas-tight extruder with exclusion of atmospheric oxygen and moisture, the organic solvent forming a single-phase mixture with the polylactide melt. The boiling point of the solvent at atmospheric pressure is from 30° to 110° C. At the extruder outlet, the melt/solvent mixture is forced through dies by which a rotating blade is passed in the presence of water. The extrudate leaving the extruder is thereby immediately quenched and chopped off, so that expansion on transfer into the atmospheric-pressure zone is prevented. It is advantageous to cool the water to from 2° to 10° C. Examples of suitable solvents are methyl formate, ethyl formate, methyl acetate, propyl acetate, dioxane and methyl ethyl ketone.

The solvent concentration is from 10 to 30 parts by weight, preferably from 15 to 25 parts by weight, based on the parts by weight of polylactide making up the remainder to 100. The granules produced in this way are dried at room temperature in a stream of nitrogen, during which they crystallize and are prevented from sticking together.

In order to produce relatively small amounts of impregnated granules, it is also possible to introduce granules impregnated with nucleating agent into a mixer and to meter in the organic solvent at room temperature over the course of from ½ to 2 hours while the granules are agitated, the solvent being taken up by the polylactide granules and the polylactide crystallizing.

The granules are fed to an injection-molding machine which is set up for blowing agent-containing injection-molding material and are melted at from 160° to 200° C. The solvent content causes a melting point depression, allowing melting temperatures lower than 180° C. to be used.

After injection into the mold provided with narrow venting slits, the solvent expands the melt under its vapor pressure, the heat of evaporation required meaning that the expanding melt cools virtually adiabatically to below the melting point and is thus expanded at below the melting point. During this, orientation and crystallization occur, giving the desired moldings of high strength, high rigidity and high heat deflection temperature in short cycle times.

The heat of evaporation of the solvent must always be greater than the heat of fusion liberated during the crystallization, which, in the case of lactide homopolymers, is about 60 J/g.

At a heat capacity of the polylactide of about 1.2 J/g.K and a heat capacity of the solvent of about 440

J/g.K, a cooling of 9° or 31° C. is obtained in the mold if the proportion by weight of solvent is 15 to 20% respectively.

For industrial safety reasons, the feed hopper and the mold of the injection-molding machine are provided with extraction, and the extracted organic solvent is absorbed, for example, by means of an activated-charcoal filter or burnt in a burner flame.

EXAMPLE

In a twin-screw extruder with a screw diameter of 30 mm, 8.0 kg/h of polylactide having an intrinsic viscosity of 1.68, measured as a 0.1% solution in chloroform at 25° C., are metered in under argon in order to expel atmospheric oxygen and moisture, and are melted at 205° C. The polylactide contains 0.4 part by weight of talc as nucleating agent for uniform foaming.

The screws are right-handed in the conveying direction. A right-handed melting zone is followed by a left-handed screw zone, causing the melt to be pressed tightly between the screws and the barrel and dynamically sealing the extruder at the feed end. The left-handed zone is followed by a right-handed conveying zone containing two kneading elements. This is followed by a further left-handed screw zone and a further right-handed conveying zone before the dies.

In the case of the first kneading element, 2.0 kg/h of methyl ethyl ketone are pumped via a piston metering pump into the right-handed conveying zone between the left-handed zones of restricted flow through a pressure valve set at 100 bar.

The melt mixed with solvent is forced through dies and chopped off by a blade rotating under water at 4° C. directly in front of the die plate.

The wet granules obtained are dried in a dry stream of nitrogen at 25° C., during which the polylactide crystallizes under the influence of the solvent.

The dried and crystallized granules are melted in an injection-molding machine at 175° C. and injected into a mold at 120° C., sufficient melt being metered in to fill the mold to ⅓ of its volume. For a maximum molding wall thickness of 5 mm, a cooling time of 30 seconds is sufficient to demold a rigid molding without sticking to the mold wall.

We claim:

1. A process for injection molding of foamed parts of polylactide, wherein a mixture of 70–90% by weight of polylactide and 10–30% by weight of a solvent homogeneously miscible with the polylactide is melted in an injection molding machine at a temperature at least 5° C. below the crystallite melting point of pure polylactide, after which the resulting polylactide melt is injected into the mold, where the solvent cools and instantly vaporizes and the polylactide melt develops pores on multiaxial expansion while simultaneously partly crystallizing in a temperature range between the glass softening point and the melting point of the pure lactide.

2. A process as claimed in claim 1, wherein the proportion of organic solvent in the polylactide is from 15 to 25% by weight of polylactide and solvent combined.

3. A process as claimed in claim 1, wherein the boiling point of the solvent employed is from 30° to 110° C. at atmospheric pressure.

4. A process as claimed in claim 1, wherein the solvent employed is miscible with the polylactide melt to form a single phase.

* * * * *